(12) United States Patent
Nanba

(10) Patent No.: US 9,770,629 B2
(45) Date of Patent: Sep. 26, 2017

(54) GOLF BALL RESIN COMPOSITION AND GOLF BALL

(71) Applicant: BRIDGESTONE SPORTS CO., LTD., Tokyo (JP)

(72) Inventor: Atsushi Nanba, Saitamaken (JP)

(73) Assignee: Bridgestone Sports Co., Ltd., Tokyo (JP)

(*) Notice: Subject to any disclaimer, the term of this patent is extended or adjusted under 35 U.S.C. 154(b) by 0 days.

(21) Appl. No.: 14/940,244

(22) Filed: Nov. 13, 2015

(65) Prior Publication Data

US 2016/0184652 A1 Jun. 30, 2016

(30) Foreign Application Priority Data

Dec. 24, 2014 (JP) ................................. 2014-260240

(51) Int. Cl.
| | | |
|---|---|---|
| *C08L 25/08* | (2006.01) | |
| *C08L 53/00* | (2006.01) | |
| *A63B 37/00* | (2006.01) | |
| *C08L 53/02* | (2006.01) | |
| *C08L 25/06* | (2006.01) | |
| *C08L 25/04* | (2006.01) | |
| *C08L 25/10* | (2006.01) | |

(52) U.S. Cl.
CPC ...... *A63B 37/0024* (2013.01); *A63B 37/0039* (2013.01); *C08L 53/02* (2013.01); *A63B 37/0033* (2013.01); *C08L 25/04* (2013.01); *C08L 25/06* (2013.01); *C08L 25/08* (2013.01); *C08L 25/10* (2013.01)

(58) Field of Classification Search
CPC .......... C08L 25/04; C08L 25/06; C08L 25/08; C08L 25/10; A63B 37/0024; A63B 37/0039

See application file for complete search history.

(56) References Cited

U.S. PATENT DOCUMENTS

| | | | | |
|---|---|---|---|---|
| 5,338,610 A | * | 8/1994 | Sullivan | ............ A63B 37/0003 260/998.14 |
| 6,203,451 B1 | * | 3/2001 | Rajagopalan | ........... B32B 33/00 473/356 |
| 6,244,978 B1 | * | 6/2001 | Higuchi | ............. A63B 37/0003 473/374 |

(Continued)

FOREIGN PATENT DOCUMENTS

| | | |
|---|---|---|
| JP | 2006-312044 A | 11/2006 |
| JP | 2013-9814 A | 1/2013 |

*Primary Examiner* — John E Simms, Jr.
(74) *Attorney, Agent, or Firm* — Sughrue Mion, PLLC

(57) ABSTRACT

A golf ball resin composition contains a base resin for which, in dynamic viscoelasticity measurement, the storage modulus of the base resin measured at 23° C., 15 Hz and 1.0% strain, and tan δ determined under the same conditions, satisfy specific values; and for which the storage modulus of the base resin measured at 23° C., 15 Hz and 10% strain, and tan δ determined under the same conditions, satisfy specific values. By using this resin composition as a golf ball cover material, the force delivered to the ball while the ball and the clubface are in contact from impact to follow-through is more easily felt, facilitating distance control of the ball. Controllability with a short iron such as a sand wedge around the green is also excellent.

11 Claims, 1 Drawing Sheet

(56) References Cited

U.S. PATENT DOCUMENTS

| | | | |
|---|---|---|---|
| 6,486,250 B1* | 11/2002 | Rajagopalan | C08L 77/00 |
| | | | 473/354 |
| 6,648,777 B2* | 11/2003 | Kennedy, III | A63B 37/0003 |
| | | | 473/374 |
| 7,278,929 B2 | 10/2007 | Umezawa et al. | |
| 7,494,427 B2* | 2/2009 | Kennedy, III | A63B 37/0031 |
| | | | 473/373 |
| 2006/0172823 A1* | 8/2006 | Loper | A63B 37/0003 |
| | | | 473/371 |
| 2013/0005508 A1 | 1/2013 | Matsuyama et al. | |
| 2014/0274470 A1* | 9/2014 | Kim | A63B 37/0092 |
| | | | 473/372 |
| 2015/0057103 A1* | 2/2015 | Shiga | C08K 5/19 |
| | | | 473/373 |

* cited by examiner

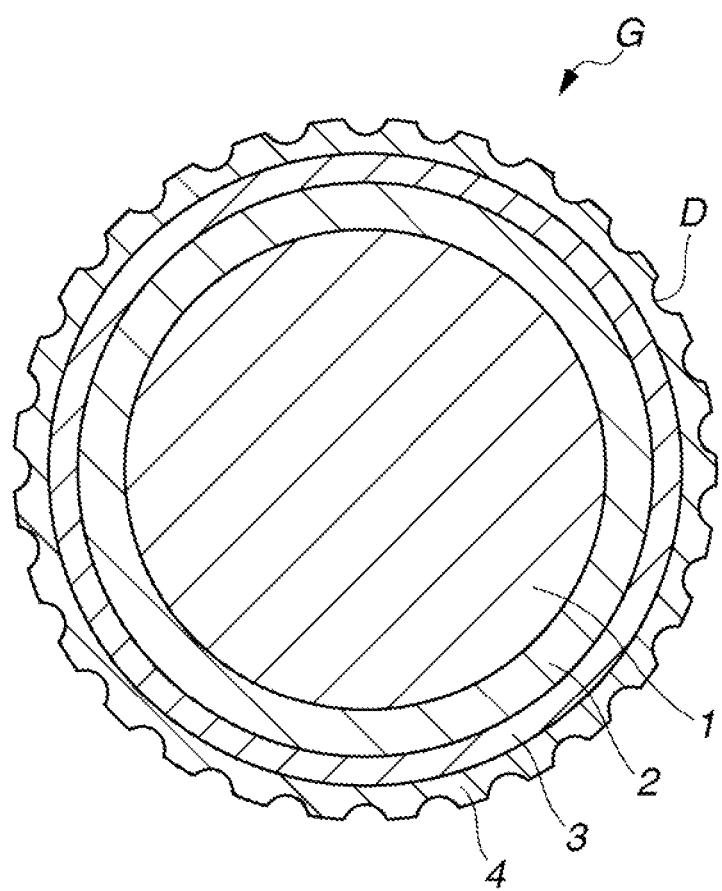

GOLF BALL RESIN COMPOSITION AND GOLF BALL

CROSS-REFERENCE TO RELATED APPLICATION

This non-provisional application claims priority under 35 U.S.C. §119(a) on Patent Application No. 2014-260240 filed in Japan on Dec. 24, 2014, the entire contents of which are hereby incorporated by reference.

BACKGROUND OF THE INVENTION

Field of the Invention

The present invention relates to a resin composition for golf balls and to golf balls in which such a composition is used. The invention relates in particular to a golf ball resin composition suitable for use as the cover material in a golf ball having a core of one or more layer and a cover of one or more layer, and to a golf ball in which such a composition is used.

Prior Art

Three-piece solid golf balls and four-piece solid golf balls that employ a urethane cover instead of an ionomer cover have come to be widely used recently among professional golfers and skilled amateurs. The purpose for doing so is to achieve not only a good distance on shots with a driver, but also to further extend the distance on shots with a middle iron such as a number six iron (I#6) and to optimize the spin rate on approach shots so as to achieve a good controllability. In addition, another important challenge is properly gauging and controlling the distance traveled by the ball on approach shots around the green at a distance of about 15 yards.

Controllability on approach shots around the green at a distance of about 15 yards depends not only on the spin rate of the golf ball, but also to a large degree on the initial velocity of the ball at launch. While there may be a variety of ways among different players for adjusting the distance traveled by a golf ball, the distance of a golf ball is usually controlled by modulating the take-back and follow-through on the swing so as to adjust the force of impact. Professional golfers and skilled amateurs in particular, as they themselves explain, control the distance of the ball while sensing the force delivered to the ball during the time that the ball and the clubface are in contact from impact to follow-through. Also, although golf balls made with a urethane cover have a high rebound, which extends the distance on shots with a driver, on approach shots, they are in contact with the clubface for only a short time and thus have a tendency to fly off too quickly. Hence, on approach shots, the force delivered to the ball is difficult for the golfer to gauge, which tends to make the distance traveled by the ball difficult to control. In other words, what professional golfers and skilled amateurs desire is to more easily sense the force delivered to the ball during the interval in which the clubface and the ball are in contact, so that distance control is easier. Furthermore, making it easier to gauge the distance of the ball on approach shots around the green gives the golfer more of an edge in playing the game.

Golf balls provided with a urethane cover so as to impart good spin receptivity have been proposed in the past in order to improve controllability on approach shots. One example is the art disclosed in JP-A 2006-312044. In addition, golf balls provided with a soft urethane cover so as to be even more receptive to spin have been disclosed in, for example, JP-A 2013-9814. However, on approach shots, both of these golf balls are too lively at takeoff, making the distance difficult to gauge.

It is therefore an object of this invention to provide a golf ball resin material and golf ball which makes the force delivered to the ball while the ball and the clubface are in contact from impact to follow-through easier to feel, facilitating distance control of the ball, and which has an excellent controllability on approach shots with, for example, a sand wedge (SW) around the green at a distance of about 15 yards.

SUMMARY OF THE INVENTION

As a result of extensive investigations, we have discovered that by using, instead of the polyurethane covers hitherto used, a cover made of a cover material composed primarily of a base resin for which, in dynamic viscoelasticity measurement, letting $E'(1)$ be the storage modulus measured at a temperature of 23° C., an oscillation frequency of 15 Hz and 1.0% strain and $T(1)$ be the tan δ defined in terms of the ratio between storage modulus and loss modulus measured under the same conditions, the values of $E'(1)$ and $T(1)$ satisfy specific ranges, and for which, letting $E'(10)$ be the storage modulus measured at the same temperature and frequency conditions and at 10% strain and $T(10)$ be the tan δ defined in terms of the ratio between storage modulus and loss modulus measured under the same conditions, the values of $E'(10)$ and $T(10)$ satisfy specific ranges, there is a fuller sensation of the ball "sticking" to the clubface than when a polyurethane cover is used, making it easier for professional golfers and skilled amateurs in particular to gauge the distance of the ball on approach shots around the green, and thus enabling a golf ball that is highly advantageous on approach shots to be provided. Such balls also enable a good distance to be imparted on shots with a driver.

Accordingly, in a first aspect, the invention provides a golf ball resin composition having a base resin wherein, in dynamic viscoelasticity measurement,
letting $E'(1)$ be the storage modulus of the base resin measured at a temperature of 23° C., an oscillation frequency of 15 Hz and 1.0% strain, and $T(1)$ be the tan δ defined in terms of the ratio between storage modulus and loss modulus of the base resin measured under the same conditions, $E'(1)$ and $T(1)$ satisfy the following ranges:

$1\ \text{MPa} < E'(1) < 80\ \text{MPa}$, $T(1) > 0.16$; and letting $E'(10)$ be the storage modulus of the base resin measured at a temperature of 23° C., an oscillation frequency of 15 Hz and 10% strain, and $T(10)$ be the tan δ defined in terms of the ratio between storage modulus and loss modulus of the base resin measured under the same conditions, $E'(10)$ and $T(10)$ satisfy the following ranges:

$1\ \text{MPa} < E'(10) < 50\ \text{MPa}$, $T(10) > 0.2$.

In the resin composition of the invention, the base resin is preferably a styrene-butadiene-styrene block copolymer. The ratio between styrene and rubber in the styrene-butadiene-styrene block copolymer, expressed as the weight ratio styrene/rubber, is preferably from 20/80 to 60/40.

The golf ball resin composition of the invention preferably includes at least one compounding ingredient selected from the group consisting of inorganic fillers, organic short fibers, crosslinking agents and antioxidants.

In a second aspect, the invention provides a golf ball having a core and a cover of at least one layer encasing the core, wherein at least one layer of the cover is formed of a resin composition containing a base resin for which, in dynamic viscoelasticity measurement, letting E'(1) be the storage modulus of the base resin measured at a temperature of 23° C., an oscillation frequency of 15 Hz and 1.0% strain, and T(1) be the tan δ defined in terms of the ratio between storage modulus and loss modulus of the base resin measured under the same conditions, E'(1) and T(1) satisfy the following ranges:

1 MPa<$E'$(1)<80 MPa, $T(1)$>0.16; and letting E'(10) be the storage modulus of the base resin measured at a temperature of 23° C., an oscillation frequency of 15 Hz and 10% strain, and T(10) be the tan δ defined in terms of the ratio between storage modulus and loss modulus of the base resin measured under the same conditions, E'(10) and T(10) satisfy the following ranges:

1 MPa<$E'$(10)<50 MPa, $T(10)$>0.2.

In the golf ball of the invention, the base resin is preferably a styrene-butadiene-styrene block copolymer. The ratio between styrene and rubber in the styrene-butadiene-styrene block copolymer, expressed as the weight ratio styrene/rubber, is preferably from 20/80 to 60/40.

The golf ball of the invention preferably includes at least one compounding ingredient selected from the group consisting of inorganic fillers, organic short fibers, crosslinking agents and antioxidants.

In one embodiment of the inventive golf ball, the resin composition forms an outermost layer of the golf ball. The outermost layer preferably has a thickness of from 0.5 to 1.0 mm.

In another embodiment of the inventive golf ball, the resin composition forms a layer inwardly adjoining an outermost layer of the cover. In the golf ball according to this embodiment, the combined thickness of the adjoining layer and the outermost layer is preferably from 0.5 to 1.0 mm.

In the inventive golf ball, the cover preferably has, in order from an inner side thereof: an envelope layer, an intermediate layer and an outermost layer.

The golf ball resin composition of the invention, when used in, for example, the cover material of a golf ball, makes it possible to provide a golf ball that enables the distance on approach shots around the green to be easily gauged and is thus competitively advantageous. Such a resin composition is particularly useful to professional golfers and skilled amateurs who are able to finely modulate the force delivered to the ball while the clubface and the ball are in contact on approach shots. In addition, the golf ball resin composition of the invention is capable of imparting to the ball a good resilience on shots with a driver.

DESCRIPTION OF THE DIAGRAMS

FIG. 1 is a schematic cross-sectional diagram of a golf ball according to one embodiment of the invention.

DETAILED DESCRIPTION OF THE INVENTION

The objects, features and advantages of the invention will become more apparent from the following detailed description, taken in conjunction with the foregoing diagrams.

The golf ball resin composition of the invention contains a base resin having, in elastic viscoelasticity measurement, a storage modulus E' measured at a temperature of 23° C., an oscillation frequency of 15 Hz and 1.0% strain, and a loss tangent (tan δ) defined in terms of the ratio between storage modulus and loss modulus measured under the same conditions, which satisfy specific ranges.

In this invention, the reason for specifying, in dynamic viscoelasticity measurement, the storage modulus E' of the resin composition and the loss tangent (tan δ) defined in terms of the ratio between storage modulus and loss modulus within specific ranges has to do with the following findings. Generally, on approach shots, the amount of ball deformation is small, increasing the cover material dependency of the ball liveliness (initial velocity) at takeoff. This invention focuses on the fact that, particularly in cases where a material which is hard and thus does not readily deform is used at the ball interior, if the cover material has a large tan δ, the rebound is low and recovery slows when the ball has incurred a force from the clubface at impact and deformed, ensuring that the ball "sticks" to the clubface. On the other hand, on shots taken with a driver, because the amount of ball deformation is large and the initial flight of the ball is more highly dependent on the properties of the material at the ball interior, even if the tan δ value of the cover material is increased, the rebound energy of the ball does not readily change. Particularly in cases where the ball interior is a hard material, there is hardly any change in the rebound. In other words, this invention is focused on the fact that, even when the ball is encased with a cover having a large tan δ, the ball initial velocity on shots with a driver is maintained yet the ball initial velocity on approach shots is lowered, allowing controllability to be imparted.

In light of the above, this invention specifies that, in dynamic viscoelasticity testing on the resin material, letting E'(1) be the storage modulus measured at a temperature of 23° C., an oscillation frequency of 15 Hz and 1.0% strain, and T(1) be the tan δ defined in terms of the ratio between storage modulus and loss modulus measured under the same conditions, 1 MPa<E'(1)<80 MPa and T(1)>0.16. The storage modulus E'(1) is preferably at least 5 MPa, and more preferably at least 10 MPa, with the upper limit being preferably not more than 70 MPa, more preferably not more than 60 MPa, and even more preferably not more than 50 MPa. At a storage modulus E'(1) outside this range, the ball has too much or too little spin. Also, when the loss tangent (tan δ) value is smaller than 0.16, the ball on approach shots around the green is too lively at takeoff, making it difficult to gauge the distance.

In this invention, it is also critical that, in dynamic viscoelasticity testing on the resin material, letting E'(10) be the storage modulus measured at a temperature of 23° C., an oscillation frequency of 15 Hz and 10% strain, and T(10) be the tan δ defined in terms of the ratio between storage modulus and loss modulus measured under the same conditions, 1 MPa<E'(10)<50 MPa and T(10)>0.2. The storage modulus E'(10) is preferably at least 5 MPa, with the upper limit being preferably not more than 50 MPa, more preferably not more than 40 MPa, and even more preferably not more than 30 MPa. At a storage modulus E'(10) outside this range, the ball has too much or too spin. Also, when the loss tangent (tan δ) value is smaller than 0.2, the ball on approach shots around the green is too lively at takeoff, making it difficult to gauge the distance.

Various methods may be used to measure the dynamic viscoelasticity of the resin material. For example, by using thin strips of molded material as the samples, employing a dynamic viscoelasticity measuring apparatus (such as those available under the product name EPLEXOR from GABO) and using a tensile test holder, the tan δ values in the dynamic strain sweep range of 0.1% to 1% to 10% can be measured at an initial strain of 10%, a measurement temperature of 23° C. and an oscillation frequency of 15 Hz, and the slopes determined based on the results of these measurements.

Examples of resin materials having the above dynamic viscoelasticity include styrene-butadiene-styrene block copolymers (SBS). Commercial products may be used, preferred examples of which include those available under the trade names Tufprene and Asaprene T from Asahi Kasei Chemicals Corporation, those available under the trade name Kraton D from Kraton Polymer Japan, and those available under the trade name JSR TR from JSR Corporation.

When a styrene-butadiene-styrene block copolymers (SBS) is used, the compounding ratio of the styrene component and the rubber component, although not particularly limited, is preferably within the styrene/rubber weight ratio range of 20/80 to 60/40. Outside this range, the feel of the ball at impact may worsen.

It is recommended that the base material, such as the above styrene-butadiene-styrene block copolymer, be included in an amount based on the overall resin composition which, although not particularly limited, is at least 60 wt %, preferably at least 70 wt %, more preferably at least 80 wt %, and most preferably at least 90 wt %. If the content is inadequate, the desired effects of the invention may not be obtained.

Silica may be included in the resin composition. Before kneading it with the base resin such as a styrene-butadiene-styrene block copolymer and other additives, it is preferable to mix the silica together with a silane coupling agent. In this case, to increase the reaction efficiency of the silane coupling agent, the silica and the butadiene within the copolymer, it is preferable to adjust the temperature of the resin composition to about 150 to 170° C. and carry out kneading. The silica content is preferably from 10 to 80 parts by weight per 100 parts by weight of the base resin. The content of silane coupling agent is preferably from 1 to 8 parts by weight per 100 parts by weight of the base resin.

Calcium carbonate may be included in the resin composition. In such a case, the content of calcium carbonate is preferably from 20 to 120 parts by weight per 100 parts by weight of the base resin such as a styrene-butadiene-styrene block copolymer.

The golf ball resin composition of the invention may include any the various thermoplastic resins indicated below, provided that doing so does not detract from the objects of the invention. Thermoplastic resins are exemplified by, but not limited to, ionomer resins, polyolefin elastomers (including polyolefins and metallocene-catalyzed polyolefins), polystyrene elastomers, diene polymers, polyacrylate polymers, polyamide elastomers, polyurethane elastomers, polyester elastomers and polyacetals.

In addition, optional additives may be suitably included according to the intended application in the golf ball resin composition of the invention. For example, in cases where the golf ball material of the invention is used as a cover material, various additives such as fillers (inorganic fillers), organic short fibers, reinforcements, crosslinking agents, pigments, dispersants, antioxidants, ultraviolet absorbers and light stabilizers may be added to the above ingredients. When these additives are included, the content thereof, per 100 parts by weight of the base resin, is preferably at least 0.1 part by weight, and more preferably at least 0.5 part by weight, with the upper limit being preferably not more than 10 parts by weight, and even more preferably not more than 4 parts by weight.

The golf ball resin composition of the invention can be obtained by using any of various types of mixers, such as a kneading type single-screw or twin-screw extruder, a Banbury mixer, a kneader or a Labo Plastomill, to mix together the above components.

The golf ball resin composition of the invention may be used as the material for a one-piece golf ball, or may be used as the cover material in a two-piece solid golf ball composed of a core and a cover encasing the core or in a multi-piece solid golf ball composed of a core of one or more layer and a multilayer cover encasing the core.

The cover is a member which encases the core. It has at least one layer, and may be, for example, a two-layer cover or a three-layer cover. In the case of a two-layer cover, sometimes the inner layer is called the intermediate layer and the outer layer is called the outermost layer. In the case of a three-layer cover, the respective layers are sometimes called, in order from the inside: the envelope layer, the intermediate layer and the outermost layer. For example, referring to FIG. 1, a four-piece solid golf ball G having a core 1, an envelope layer 2 encasing the core 1, an intermediate layer 3 encasing the envelope layer 2, and a cover layer 4 encasing the intermediate layer 3 is shown. Numerous dimples D for improving the aerodynamic properties are generally formed on the outside surface of the outermost layer 4.

In particular, using the resin composition of the invention as the material for the outermost layer of the cover or as the material for a layer that inwardly adjoins the outermost layer is preferable from the standpoint of effectively eliciting the desired effects of the invention. In this case, although not particularly limited, when this invention is employed in the outermost layer of the cover, the thickness of the outermost layer is preferably in the range of 0.5 to 1.0 mm. When this invention is employed in the adjoining layer, the combined thickness of the adjoining layer and the outermost layer is preferably in the range of 0.5 to 1.0 mm.

In cases where the resin composition of the invention is employed in the outermost layer, the other cover layers may be formed of an ionomer resin or a highly neutralized resin material. For example, the envelope layer may be formed of a highly neutralized resin material, and the intermediate layer may be formed of an ionomer resin.

When the resin composition of the invention is used as the material in the layer that inwardly adjoins the outermost layer, the other cover layers may be formed of an ionomer resin, a highly neutralized resin material and a polyurethane resin. For example, the envelope layer may be formed of a highly neutralized resin material or an ionomer resin, and the outermost layer may be formed of an ionomer resin or a polyurethane resin.

The core may be formed using a known rubber material as the base material. A known base rubber such as a natural rubber or a synthetic rubber may be used as the base rubber. Specifically, it is recommended that a polybutadiene, especially cis-1,4-polybutadiene having a cis structure content of at least 40%, be primarily used. Where desired, a natural rubber, polyisoprene rubber, styrene-butadiene rubber or the like may be used together with the above polybutadiene in the base rubber.

The polybutadiene may be one synthesized using a metal catalyst such as a neodymium or other rare-earth element catalyst, a cobalt catalyst or a nickel catalyst.

Co-crosslinking agents such as unsaturated carboxylic acid and metal salts thereof; inorganic fillers such as zinc oxide, barium sulfate and calcium carbonate; and organic peroxides such as dicumyl peroxide and 1,1-bis(t-butylperoxy)-cyclohexane may be included in the base rubber. Also, commercially available antioxidants and other additives may be suitably added, where necessary.

The core diameter, although not particularly limited, is preferably at least 20 mm, more preferably at least 25 mm, and even more preferably at least 30 mm, with the upper limit being preferably not more than 38 mm.

The core deflection, i.e., the amount of deformation when a core is compressed under a final load of 1,275 N (130 kg) from an initial load state of 98 N (10 kgf), is preferably at least 2.7 mm, more preferably at least 3.0 mm, and even more preferably at least 3.3 mm, with the upper limit being preferably not more than 4.0 mm, and more preferably not more than 3.8 mm. When the deflection is too small, the feel of the ball at impact becomes too hard. On the other hand, when the deflection is too large, the feel becomes too soft or the durability to cracking on repeated impact becomes poor.

When the core is encased by an envelope layer, the diameter of the resulting encased sphere, although not particularly limited, is preferably at least 38 mm, with the upper limit being preferably not more than 40 mm. The envelope layer has a thickness of preferably at least 1.0 mm, with the upper limit being preferably not more than 1.7 mm.

The deflection of the envelope-encased sphere, i.e., the amount of deformation when this sphere is compressed under a final load of 1,275 N (130 kg) from an initial load state of 98 N (10 kgf), is preferably at least 2.7 mm, and more preferably at least 3.0 mm, with the upper limit being preferably not more than 3.7 mm, and more preferably not more than 3.6 mm. When the deflection is too small, the feel of the ball at impact becomes too hard. On the other hand, when the deflection is too large, the feel becomes too soft or the durability to cracking on repeated impact becomes poor.

The envelope layer has a material hardness expressed in terms of Shore D hardness which, although not particularly limited, may be set to preferably at least 46, and more preferably at least 48. The upper limit may be set to preferably not more than 56, and more preferably not more than 53.

When the envelope layer-encased sphere is encased by an intermediate layer, the diameter of the resulting encased sphere, although not particularly limited, is preferably at least 40 mm, with the upper limit being preferably not more than 42 mm. The intermediate layer has a thickness of preferably at least 0.3 mm, with the upper limit being preferably not more than 1.3 mm.

The deflection of the intermediate layer-encased sphere, i.e., the amount of deformation when this sphere is compressed under a final load of 1,275 N (130 kg) from an initial load state of 98 N (10 kgf), is preferably at least 2.5 mm, with the upper limit being preferably not more than 3.4 mm, and more preferably not more than 3.1 mm. When the deflection is too small, the feel of the ball at impact becomes too hard. On the other hand, when the deflection is too large, the feel becomes too soft or the durability to cracking on repeated impact becomes poor.

The intermediate layer has a material hardness expressed in terms of Shore D hardness which, although not particularly limited, may be set to preferably at least 50, more preferably at least 55, and even more preferably at least 60. The upper limit may be set to preferably not more than 67, and more preferably not more than 63.

When the intermediate layer-encased sphere is encased by an outermost layer, the thickness of the outermost layer is preferably at least 0.5 mm, with the upper limit being preferably not more than 1.0 mm, and more preferably not more than 0.8 mm. That is, when the resin composition of the invention is employed as the outermost layer of the cover, the thickness of the outermost layer is preferably in the range of 0.5 to 1.0 mm. When the resin composition of the invention is employed as the layer inwardly adjoining the outermost layer, the combined thickness of the outermost layer and the adjoining layer is preferably in the range of 0.5 to 1.0 mm.

The ball deflection, i.e., the amount of deformation when the ball is compressed under a final load of 1,275 N (130 kg) from an initial load state of 98 N (10 kgf), is preferably at least 2.4 mm, and more preferably at least 2.5 mm, with the upper limit being preferably not more than 3.2 mm, more preferably not more than 3.0 mm, and even more preferably not more than 2.9 mm. When the deflection is too small, the feel of the ball at impact becomes too hard. On the other hand, when the deflection is too large, the feel becomes too soft or the durability to cracking on repeated impact becomes poor.

Numerous dimples of one, two or more types may be formed on the surface of the cover. In addition, various paints may be applied to the cover surface. Owing to the need for the paint to be able to withstand the harsh conditions of golf ball use, a two-part curing urethane paint, and especially a non-yellowing urethane paint, is preferred as this paint.

EXAMPLES

The following Examples and Comparative Examples are provided to illustrate the invention, and are not intended to limit the scope thereof.

Examples 1 to 3, Comparative Examples 1 and 2

Preparation of Golf Ball Resin Composition

Resin compositions for the outermost layer were prepared as shown in Table 1 below. These compounding ingredients were kneaded in a kneading-type twin-screw extruder, then molded into sheets at a temperature of 150 to 210° C. and under an applied pressure of 5 to 10 MPa. Next, test pieces in the form of thin strips (for a chuck interval of 10 mm) having a width of 3 mm and a thickness of 2 mm were fabricated. The dynamic viscoelasticity of this test specimen was measured using a dynamic viscoelasticity measuring apparatus (available under the product name EPLEXOR from GABO) and a tensile test holder. Specifically, the storage modulus and tan δ (ratio of storage modulus and loss modulus) under dynamic strains of from 0.1% to 1% to 10% were measured at an initial strain of 10%, a measurement temperature of 23° C. and an oscillation frequency of 15 Hz. The storage modulus measured at this temperature and frequency and at a strain of 1% was denoted as E'(1) and the tan δ was denoted as T(1). The storage modulus of the dynamic viscoelasticity measured at the same temperature and frequency but at a strain of 10% was denoted as E'(10) and the tan δ was denoted as T(10).

TABLE 1

| Outermost layer | | Example 1 | Example 2 | Example 3 | Comparative Example 1 | Comparative Example 2 |
|---|---|---|---|---|---|---|
| Resin material (pbw) | Styrene-butadiene-styrene block copolymer (1) | | 100 | 100 | | |
| | Styrene-butadiene-styrene block copolymer (2) | 100 | | | | |
| | Aromatic ether-based polyurethane elastomer (1) | | | | 25 | 62.5 |
| | Aromatic ether-based polyurethane elastomer (2) | | | | 75 | 37.5 |
| | Polyester elastomer | | | | 12 | 12 |
| | Titanium oxide | | 2.8 | 2.8 | 3.5 | 3.5 |
| | Ultramarine | | | | 0.4 | 0.4 |
| | Polyethylene wax | | | | 1 | 1 |
| | Montan wax | | | | 0.4 | 0.4 |
| | Isocyanate compound | | | | 7.5 | 7.5 |
| Dynamic viscoelasticity | E'(1), MPa | 41 | 17 | 17 | 87 | 62 |
| | T(1) | 0.200 | 0.184 | 0.184 | 0.143 | 0.134 |
| | E'(10), MPa | 25 | 10 | 10 | 45 | 37 |
| | T(10) | 0.212 | 0.206 | 0.206 | 0.241 | 0.210 |

Details on the materials in the outermost layer are given below. Numbers in the table stand for parts by weight.

Styrene-butadiene-styrene block copolymer (1): SBS available under the trade name "TR 2003" from JSR Corporation Styrene-butadiene-styrene block copolymer (2): SBS available under the trade name "TR 2250" from JSR Corporation Aromatic ether-based polyurethane elastomer (1): Available under the trade name "Pandex T8283" from DIC Bayer Polymer, Ltd.

Aromatic ether-based polyurethane elastomer (2): Available under the trade name "Pandex T8290" from DIC Bayer Polymer, Ltd.

Polyester elastomer: A thermoplastic polyether ester elastomer available under the trade name "Hytrel 4401" from DuPont-Toray Co., Ltd.

Isocyanate compound: 4,4'-Diphenylmethane diisocyanate

Next, four-piece solid golf balls composed of a core, an envelope layer, an intermediate layer and an outermost layer were fabricated. The above resin material was used in the outermost layer. The materials for the core, the envelope layer and the intermediate layer, which were the same for all the Examples, are shown in Table 2 below.

TABLE 2

| Members | Ingredients | Amount |
|---|---|---|
| Intermediate layer | Na ionomer | 50 |
| | Zn ionomer (1) | 35 |
| | Zn ionomer (2) | 15 |
| | Trimethylolpropane | 1.1 |
| Envelope layer | HPF 1000 | 100 |
| Core | cis-1,4-Polybutadiene | 100 |
| | Colorant | 0.09 |
| | Barium sulfate | 21.67 |
| | Zinc oxide | 4 |
| | Zinc stearate | 0.4 |
| | Antioxidant | 0.1 |
| | Zinc salt of pentachlorothiophenol | 0.3 |
| | Zinc acrylate | 31 |
| | Dicumyl peroxide | 1 |

Details on the materials in the outermost layer are given below. Numbers in the table stand for parts by weight.

cis-1,4-Polybutadiene: Available under the trade name "BR 01" from JSR Corporation Dicumyl peroxide: Available under the trade name "Percumyl D" from NOF Corporation Antioxidant: 2,2'-Methylenebis(4-methyl-6-t-butylphenol), available under the trade name "Nocrac NS-6" from Ouchi Shinko Chemical Industry Co., Ltd.

Details on the materials in the envelope layer and the intermediate layer are given below. Numbers in the table stand for parts by weight.

HPF 1000: HPF™ 1000, from E. I. DuPont de Nemours & Co., Ltd.

Na ionomer: Available under the trade name "Himilan 1605" from DuPont-Mitsui Polychemicals Co., Ltd.

Zn ionomer (1): Available under the trade name "Himilan 1706" from DuPont-Mitsui Polychemicals Co., Ltd.

Zn ionomer (2): Available under the trade name "Himilan 1557" from DuPont-Mitsui Polychemicals Co., Ltd.

Cores were fabricated by preparing a core rubber composition according to the formulation shown in Table 2, then molding and vulcanizing the composition at 155° C. for 15 minutes. Next, an envelope layer and an intermediate layer compounded from the resin materials shown in Table 2 were successively injection-molded so as to encase the core. Last of all, an outermost layer compounded from the resin materials shown in Table 1 was formed over the intermediate layer, thereby producing a golf ball. Numerous dimples were formed on the outer surface of the outermost layer at the same time by injection molding. In addition, urethane paint was spray-painted onto the ball surface.

For each of the golf balls obtained in the Working Examples and Comparative Examples, the deflection and other properties of the respective layer-encased spheres and the ball, and also the "ball behavior on full shots," "ball behavior on middle iron shots," "ball behavior on approach shots" and "sensory evaluations on approach shots from positions around the green at 15 yards from the pin" were evaluated as described below. The results are shown in Table 3.

Diameters of Core, Envelope Layer-Encased Sphere and Intermediate Layer-Encased Sphere The diameters at five random places on the surface of a core, an envelope layer-encased sphere or an intermediate layer-encased sphere were measured at a temperature of 23.9±1° C. and, using the average of these measurements as the measured value for a single core, envelope layer-encased sphere or intermediate layer-encased sphere, the average diameter for five measured cores, envelope layer-encased spheres or intermediate layer-encased spheres was determined.

Ball Diameter

The diameters at 15 random dimple-free places (lands) on the surface of a ball were measured at a temperature of 23.9±1° C. and, using the average of these measurements as the measured value for a single ball, the average diameter for five measured balls was determined.

Deflections of Core, Envelope Layer-Encased Sphere, Intermediate Layer-Encased Sphere and Ball The core, envelope layer-encased sphere, intermediate layer-encased sphere or ball was placed on a hard plate and the amount of deflection when compressed under a final load of 1,275 N (130 kgf) from an initial load of 98 N (10 kgf) was measured for each. The amount of deflection here refers to the measured value obtained after holding the test specimen isothermally at 23.9° C.

Ball Behavior on Full Shots

A club was mounted on a golf swing robot, and the spin rate, launch angle and initial velocity of the ball immediately after being struck at a head speed (HS) of 46 m/s were measured with an initial velocity measuring apparatus. The results are shown in Table 3.

Ball Behavior on Middle Iron Shots

An iron (I#6) was mounted on a golf swing robot, and the spin rate, launch angle and initial velocity of the ball immediately after being struck at a head speed (HS) of 42 m/s were measured with an initial velocity measuring apparatus. The results are shown in Table 3.

Ball Behavior on Approach Shots

A sand wedge (SW) was mounted on a golf swing robot, and the spin rate, launch angle and initial velocity of the ball immediately after being struck at head speeds (HS) of 20 m/s and 11 m/s were measured with an initial velocity measuring apparatus. The results are shown in Table 3.

Sensory Evaluation on Approach Shots from Positions Around Green at 15 Yards from Pin Sample golf balls were placed in the semi-rough at a distance of about 15 yards from the cup on the green. From 5 to 15 balls were hit toward the cup with a sand wedge (SW) and subjected to the following evaluations (1) to (4) according to the criteria indicated below by a panel of eight golfers.

(1) Crispness at Impact
  1 point: too crisp
  2 points: not too crisp
  3 points: liveliness suitably held down
(2) "Sticking" of Ball to Clubface
  1 point: no sense of "sticking"
  2 points: cannot say either way
  3 points: clearly has a sense of "sticking"
(3) Controllability when Hit High
  1 point: distance hard to gauge
  2 points: cannot say either way
  3 points: distance easy to gauge
(4) Controllability when Hit Low
  1 point: distance hard to gauge
  2 points: cannot say either way
  3 points: distance easy to gauge

TABLE 3

| | | | Example | | | Comparative Example | |
|---|---|---|---|---|---|---|---|
| | | | 1 | 2 | 3 | 1 | 2 |
| Core | Diameter (mm) | | 36.3 | 36.3 | 36.3 | 36.3 | 36.3 |
| | Weight (g) | | 29.95 | 29.95 | 29.95 | 29.95 | 29.95 |
| | Deflection (mm) | | 3.6 | 3.6 | 3.6 | 3.6 | 3.6 |
| Envelope layer | Diameter (mm) (average) | | 38.9 | 38.9 | 38.9 | 38.9 | 38.9 |
| | Weight (g) (average) | | 35.50 | 35.50 | 35.50 | 35.50 | 35.50 |
| | Deflection (mm) (average) | | 3.3 | 3.3 | 3.3 | 3.3 | 3.3 |
| Intermediate layer | Diameter (mm) (average) | | 41.0 | 41.0 | 41.5 | 41.0 | 41.0 |
| | Weight (g) (average) | | 40.50 | 40.50 | 41.83 | 40.50 | 40.50 |
| | Deflection (mm) (average) | | 2.9 | 2.9 | 2.7 | 2.9 | 2.9 |
| Outermost layer | Diameter (mm) (average) | | 42.53 | 42.59 | 42.54 | 42.69 | 42.72 |
| | Weight (g) (average) | | 44.01 | 44.18 | 44.06 | 45.34 | 45.5 |
| | Deflection (mm) (average) | | 2.75 | 2.78 | 2.68 | 2.73 | 2.74 |
| Ball behavior on full shots | Driver (W#1) HS, 46 m/s | Initial velocity (m/s) | 66.3 | 66.5 | 66.7 | 66.3 | 66.3 |
| | | Launch angle (°) | 10.4 | 10.1 | 10.3 | 11.1 | 10.6 |
| | | Spin rate (rpm) | 3,314 | 3,970 | 3,800 | 2,878 | 3,492 |
| Ball behavior on middle iron shots | 6-Iron HS, 42 m/s | Initial velocity (m/s) | 57.1 | 57.3 | 57.6 | 57.4 | 57.4 |
| | | Launch angle (°) | 15.1 | 14 | 14 | 16 | 15 |
| | | Spin rate (rpm) | 6,367 | 7,519 | 7,632 | 5,509 | 6,745 |
| Ball behavior on approach shots | Sand wedge (SW) HS, 20 m/s | Initial velocity (m/s) | 18.2 | 18.2 | 18.2 | 18.4 | 18.5 |
| | | Launch angle (°) | 28.1 | 27.9 | 27.8 | 27.7 | 26.9 |
| | | Spin rate (rpm) | 6,031 | 6,392 | 6,421 | 6,117 | 6,552 |
| | Sand wedge (SW) HS, 11 m/s | Initial velocity (m/s) | 10.6 | 10.6 | 10.6 | 10.8 | 10.9 |
| | | Launch angle (°) | 29.2 | 28.6 | 28.7 | 28.6 | 27.6 |
| | | Spin rate (rpm) | 3,802 | 3,578 | 3,586 | 3,458 | 3,754 |
| Evaluations on approach shots from Positions around green* | (1) Crispness of ball at impact | | 3.0 | 3.0 | 3.0 | 1.0 | 1.0 |
| | (2) "Sticking" of ball to clubface | | 3.0 | 3.0 | 3.0 | 1.0 | 2.0 |
| | (3) Controllability when hit high | | 3.0 | 3.0 | 3.0 | 3.0 | 3.0 |
| | (4) Controllability when hit low | | 3.0 | 3.0 | 3.0 | 1.0 | 1.0 |

*This refers to sensory evaluations on approach shots with a sand wedge from positions around the green at 15 yards from the pin.

As is apparent from the results in Table 3, the balls in Comparative Examples 1 and 2 had initial velocities on full shots that were comparable with that of the ball in Example 1. However, in both of these cases, the initial velocity of the ball on approach shots was high and the ball separated rapidly from the clubface at the time of impact. Also, in Comparative Examples 1 and 2, in the sensory evaluations on approach shots with a sand wedge from positions around the green at 15 yards from the pin, the ball felt too crisp or was felt to have inadequate "stick" to the clubface.

Japanese Patent Application No. 2014-260240 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball resin composition comprising a base resin wherein, in dynamic viscoelasticity measurement, letting E'(1) be the storage modulus of the base resin measured at a temperature of 23° C., an oscillation frequency of 15 Hz and 1.0% strain, and T(1) be the tan δ defined in terms of the ratio between storage modulus and loss modulus of the base resin measured under the same conditions, E'(1) and T(1) satisfy the following ranges:

1 MPa<$E'(1)$<80 MPa, $T(1)$>0.16; and letting E'(10) be the storage modulus of the base resin measured at a temperature of 23° C., an oscillation frequency of 15 Hz and 10% strain, and T(10) be the tan δ defined in terms of the ratio between storage modulus and loss modulus of the base resin measured under the same conditions, E'(10) and T(10) satisfy the following ranges:

1 MPa<$E'(10)$<50 MPa, $T(10)$>0.2, wherein the golf ball resin composition does not comprise a saponified polymer and/or a polyamide;
wherein the base resin is a styrene-butadiene-styrene block copolymer and the amount of the styrene-butadiene-styrene block copolymer is 100 wt % of the overall resin composition.

2. The golf ball resin composition of claim 1, wherein the ratio between styrene and rubber in the styrene-butadiene-styrene block copolymer, expressed as the weight ratio styrene/rubber, is from 20/80 to 60/40.

3. The golf ball resin composition of claim 1 which includes at least one compounding ingredient selected from the group consisting of inorganic fillers, organic short fibers, crosslinking agents and antioxidants.

4. A golf ball comprising a core and a cover of at least one layer encasing the core, wherein at least one layer of the cover is formed of a resin composition comprising a base resin for which, in dynamic viscoelasticity measurement, letting E'(1) be the storage modulus of the base resin measured at a temperature of 23° C., an oscillation frequency of 15 Hz and 1.0% strain, and T(1) be the tan δ defined in terms of the ratio between storage modulus and loss modulus of the base resin measured under the same conditions, E'(1) and T(1) satisfy the following ranges:

1 MPa<$E'(1)$<80 MPa, $T(1)$>0.16; and letting E'(10) be the storage modulus of the base resin measured at a temperature of 23° C., an oscillation frequency of 15 Hz and 10% strain, and T(10) be the tan δ defined in terms of the ratio between storage modulus and loss modulus of the base resin measured under the same conditions, E'(10) and T(10) satisfy the following ranges:

1 MPa<$E'(10)$<50 MPa, $T(10)$>0.2, wherein the golf ball resin composition does not comprise a saponified polymer and/or a polyamide;
wherein the base resin is a styrene-butadiene-styrene block copolymer and the amount of the styrene-butadiene-styrene block copolymer is 100 wt % of the overall resin composition.

5. The golf ball of claim 4, wherein the ratio between styrene and rubber in the styrene-butadiene-styrene block copolymer, expressed as the weight ratio styrene/rubber, is from 20/80 to 60/40.

6. The golf ball of claim 4 which includes at least one compounding ingredient selected from the group consisting of inorganic fillers, organic short fibers, crosslinking agents and antioxidants.

7. The golf ball of claim 4, wherein the resin composition forms an outermost layer of the cover.

8. The golf ball of claim 7, wherein the outermost layer has a thickness of from 0.5 to 1.0 mm.

9. The golf ball of claim 4, wherein the resin composition forms a layer inwardly adjoining an outermost layer of the cover.

10. The golf ball of claim 9, wherein the combined thickness of the adjoining layer and the outermost layer is from 0.5 to 1.0 mm.

11. The golf ball of claim 4, wherein the cover comprises, in order from an inner side thereof: an envelope layer, an intermediate layer and an outermost layer.

* * * * *